United States Patent Office 3,531,432
Patented Sept. 29, 1970

3,531,432
FLUOROCARBON POLYMER COMPOSITION HAVING SELF-LUBRICATING CHARACTERISTICS
Clair Warren Graver, King of Prussia, Pa., assignor to Pennwalt Corporation, Philadelphia, Pa., a corporation of Pennsylvania
No Drawing. Continuation-in-part of application Ser. No. 730,631, May 20, 1968. This application Oct. 1, 1968, Ser. No. 764,336
Int. Cl. C08f 3/28, 29/22
U.S. Cl. 260—41
6 Claims

ABSTRACT OF THE DISCLOSURE

A moldable, self-lubricating fluorocarbon polymer composition is comprised of from about 40 to about 75 wt. percent vinylidene fluoride polymer, from about 10 to about 35 wt. percent tetrafluoroethylene polymer and from about 5 to about 30 wt. percent of telomers of the structure R—$(CF_2CF_2)_nX$ where R is perfluoroalkyl or monochloroperfluoroalkyl of one to four carbon atoms, X is chlorine, fluorine or iodine, and $n$ is an integer from 6 to 16. The composition may be molded to form sleeve bearings, ball joint sockets, and other bearing shapes.

---

This application is a continuation-in-part of application Ser. No. 730,631 filed on May 20, 1968, now abandoned.

This invention relates to fluorocarbon polymer compositions having self-lubricating characteristics. More particularly, this invention concerns a composition comprising of polyvinylidene fluoride, polytetrafluoroethylene and fluorocarbon telomers, which composition can be fabricated by conventional thermoplastics forming operations into various bearing shapes.

There is a great demand in the processing industries for self-lubricated bearings which are constructed of relatively inert materials that will not contaminate the substances being processed, or where corrosive conditions, extreme temperatures or inaccessibility to conventional lubrication are encountered. Attempts to meet these needs with bearings fabricated from polytetrafluoroethylene (PTFE) have not been altogether successful. Although PTFE bearings have generally adequate wear properties under light loads and at low rubbing velocities, PTFE creeps or cold flows under heavy loads and high rubbing velocities resulting in bearing deformation and failure. This condition has been somewhat ameliorated by adding particulate fillers to the PTFE, such as, for example, graphite, glass fibers, glass micro-beads and bronze. A marked disadvantage of the PTFE products, however, is their high cost of fabrication which involves preforming, sintering at around 340 to 440° C., followed by a slow cooling cycle. Moreover, precision parts must be machined to specifications from the sintered shapes.

In accordance with the present invention, a self-lubricating fluorocarbon polymer composition is provided comprised of a substantially uniform blend of from about 40 to about 75 percent by weight of vinylidene fluoride polymer, from about 10 to about 35 percent by weight of tetrafluoroethylene polymer, and from about 5 to about 30 precent by weight of telomers of the structure R—$(CF_2CF_2)_nX$ where R is perfluoroalkyl or monochloroperfluoroalkyl radicals having one to four carbon atoms, X is chlorine, fluorine or iodine, and $n$ is an integer of from 6 to 16. The combined proportions of the foregoing three components in the composition will, of course, total 100 percent. The compositions can also have incorporated therein, in the preferred embodiments, any of the well known non-metallic particulate fillers such as those previously mentioned, in proportions, for example, of from about 5 to 40 parts by weight of filler per 100 parts of fluorocarbon polymer. Preferably, about 10 to 25 parts by weight of non-metallic filler, e.g., glass micro-beads, glass fibers, glass powder or graphite, will serve to improve wear characteristics.

The terms "vinylidene fluoride polymer" and "polyvinylidene fluoride" as used herein are meant not only to refer to the normally solid high-molecular weight homopolymers of vinylidene fluoride (such as described in U.S. 3,139,539) but also to the normally solid copolymers of vinylidene fluoride containing a predominance of vinylidene fluoride units, for example, copolymers with up to about 30 mole percent of such comonomers as tetrafluoroethylene, trifluoroethylene, vinyl fluoride, 1-chloro-1,2,2-trifluoroethylene, sym-dichlorodifluoroethylene, hexafluoropropene, and others known in the art, the copolymers having essentially the same properties as the homopolymer with regard to its presently disclosed utility. Similarly, the terms "tetrafluoroethylene polymer" and "polytetrafluoroethylene" used herein mean not only the normally solid high-molecular weight tetrafluoroethylene homopolymers (such as described in U.S. 2,559,-752) and the normally solid high-molecular weight copolymers of tetrafluoroethylene containing a predominance of tetrafluoroethylene units, for example, with up to about 30 mole percent of comonomers such as vinylidene fluoride, 1-chloro-1-fluoroethylene, hexafluoropropene, trifluorochloroethylene and the like, but also the lower-molecular weight tetrafluoroethylene polymers obtained by the pyrolysis of normally solid high-molecular weight polytetrafluoroethylene such as described in U.S. 2,496,-978 and U.S. 2,978,519.

The fluorotelomers embodied in the present composition, R—$(CF_2CF_2)_nX$, where R, X and $n$ are as previously defined, are known compositions. The telomers are wax-like substances which have melting point ranges in the order of about 100° C. to about 200° C. Preferred are the telomers mixtures described by M. Hauptschein and M. Miville in U.S. Pat. No. 3,345,424, the disclosure of which is hereby incorporated by reference.

The compositions of this invention can be readily fabricated into useful shapes, even having precision tolerances, such as sleeve bearings, ball joint sockets, gears, cams, bushings and the like articles by the conventional and inexpensive plastics forming techniques, e.g., injection molding, compression powder molding and transfer molding. The composite, self-lubricating bearings thus formed exhibit exceptionally low wear rate and good dimensional stability even when subjected to heavy loads and high rubbing velocities. The molding process is carried out in the comparatively moderate temperature range of about 165° C. to about 250° C. When the compositions are to be melt-worked prior to shaping, such as in injection molding operations, it is preferred that the polytetrafluoroethylene component be of the low-molecular weight type such as described in the previously mentioned U.S. Pats. 2,496,978 and 2,978,519. Excessive melt-working of the compositions containing high-molecular weight polytetrafluoroethylene may result in fibrillation of the PTFE polymer particles and cause voids in the molded bearing surface.

The examples next presented are set forth to illustrate the invention and not in any way to limit its scope as previously defined.

The blended compositions were prepared by coagulating measured amounts of a latex of polyvinylidene fluoride and a latex of polytetrafluoroethylene or a measured amount of particulate low-molecular weight polytetrafluoroethylene in the presence of fluorotelomer wax using a high shear mixing apparatus. The fluorotelomer wax had a melting point range ca. 105–150° C.

and was a mixture of telomers of varying chain length with the following structure:

$$(CF_3)_2CF(CF_2CF_2)_nX$$

where X is chlorine or iodine and where:

| | Percent |
|---|---|
| $n=6$ | 28–36 |
| $n=7$ | 25–39 |
| $n=8$ | 17–20 |
| $n=9$ | 9–11 |
| $n=10$ | 5–8 |
| $n=11$ | 2–4 |
| $n=12$ | 1–2.2 |
| $n=13$ | 0.1–2 |
| $n=14$ to 16 | 0.2–1 |

The mixture was filtered and the solids washed with water to remove traces of surfactant present in the fluoropolymer latexes. The powder blends were dried in a vacuum oven at 80° C.

Test bearings were prepared by compression molding the foregoing powder blends at 6000 p.s.i. and 225° C. into rings (bearing specimens) one inch in diameter and ⅛ inch thick. The efficiency of the bearing composition was determined by measuring the "PV" limit of the material at various velocities and loads when a wear ring was in contact with the thrust washer test specimen. "PV" is the product of pressure in pounds per square inch (p.s.i.) and velocity in feet per minute (f.p.m.). The PV tests were carried out with a thrust washer test apparatus described in a paper given by J. T. O'Rourke at the Fluorocarbon Design Conference of the Society of the Plastics Industry, Inc., Detroit, Mich., June 3, 1965. The sample bearing (thrust washer) was mounted in an antifriction bearing equipped with a torque arm. The test specimen holder contained three thermocouples strategically spaced and in contact with the test specimen. The raised portion of the thrust washer was in contact with a carbon steel wear ring having a 12 to 16 micro-inch finish (18–22 Rockwell hardness) at room temperature and dry. Each test was conducted using a new wear ring; all parts were wiped clean with chloroform. The test was started with a one hour break-in period at 50 p.s.i. and 100 r.p.m. The load was increased by step-loading in 50 p.s.i. increments every 0.75 hour until failure of the test specimen occurred. This failure was determined by carefully monitoring the change in friction torque and temperature after each step loading. When the torque and/or temperature failed to stabilize, a failure of the specimen was noted. The "PV" limit value was defined as the highest plateau at which equilibrium occurred.

The following table presents test data showing the superiority of the self-lubricating compositions of this invention compared to compositions wherein one of the essential components is not present. Results comparable to those reported below are observed when fluorotelomer fluorides are substituted for the fluorotelomer chlorides and iodides components of the enumerated examples.

| Example No. | Bearing composition in weight percents of described components | PV limits (average), f.p.m. × p.s.i. | Observations and remarks on bearing performance |
|---|---|---|---|
| 1 | 100% A | 7,500 | Unacceptable, gross spalling. |
| 2 | 70% A ----- 30% B | 7,500 | Unacceptable, deformation. |
| 3 | 70% A ----- 30% C | 10,000 | Unacceptable; gross spalling. |
| 4 | 87% A ----- 13% D | 7,500 | Unacceptable; deformation and spalling. |
| 5 | 87% A ----- 13% E | 7,500 | Do. |
| 6 | 66.5% A ----- 28.5% B ----- 5% D | 10,000 | Good results. |
| 7 | 63.5% A ----- 27% B ----- 9.5% D | 30,000 | Excellent results. |
| 8 | 56% A ----- 24% B ----- 20% D | 20,000 | Do. |
| 9 | 72% A ----- 18% B ----- 10% D | 15,000 | Good results. |
| 10 | 55% A ----- 35% B ----- 10% D | 15,000 | Do. |
| 11 | 60% A ----- 25% B ----- 15% E | 25,000 | Do. |
| 12 [1] | 49% A ----- 25% C ----- 15% D ---- 10% F ----- 1% G | 35,000 | Excellent results. |
| 13 [1] | 59% A ----- 15% C ----- 15% D ---- 10% F ----- 1% G | 30,000 | Do. |
| 14 | 49% A ----- 25% B ----- 15% D ---- 10% F ----- 1% G | 25,000 | Do. |

NOTES:
[1] Composition melt-worked at 175° C. before molding.
A=polyvinylidene fluoride.
B=polytetrafluoroethylene (high molecular weight).
C=polytetrafluoroethylene (lower molecular weight obtained by pyrolysis of PTFE according to procedure of U.S. 2,496,978).
D=fluorotelomers of structure $(CF_3)_2CF(CF_2CF_2)_nCl$.
E=fluorotelomers of structure $(CF_3)_2CF(CF_2CF_2)_nI$.
F=glass fibers (Johns Manville Vitro Strand Type G Fiber Glass, 12 micron fibers).
G=zinc oxide (thermal stabilizer).

I claim:
1. A composition comprised of a blend of from about 40 to about 75% by weight of vinylidene fluoride polymer, from about 10 to about 35% by weight of tetrafluoroethylene polymer, and from about 5 to about 30% by weight of telomers having the structure

$$R-(CF_2CF_2)_nX$$

where R is selected from the class consisting of perfluoroalkyl and monochloroperfluoroalkyl radicals having one to four carbon atoms, $n$ is an integer of from 6 to 16, and X is chlorine, fluorine or iodine.

2. The composition according to claim 1 where X is chlorine.

3. The composition according to claim 1 where X is iodine.

4. A fabricated article prepared by the heat and pressure molding of the composition of claim 1.

5. The composition of claim 1 containing admixed therein from about 5 to 40 parts of non-metallic particulate filler per 100 parts by weight of the fluorocarbon polymers.

6. The composition of claim 5 wherein there is about 10 to 25 parts of the filler per 100 parts of polymers.

References Cited

UNITED STATES PATENTS 3,287,288 11/1966 Reiling _____ 260—4
3,345,424 8/1967 Hauptschein et al. __ 260—653.1

MORRIS LIEBMAN, Primary Examiner
R. ZAITLEN, Assistant Examiner

U.S. Cl. X.R.
252—12; 260—900